(12) United States Patent
Moussette et al.

(10) Patent No.: US 10,394,325 B2
(45) Date of Patent: Aug. 27, 2019

(54) INPUT FRICTION MECHANISM FOR ROTARY INPUTS OF ELECTRONIC DEVICES

(71) Applicant: Apple Inc., Cupertino, CA (US)

(72) Inventors: Camille Moussette, Cupertino, CA (US); John B. Morrell, Cupertino, CA (US); Patrick Kessler, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/103,091

(22) PCT Filed: Dec. 10, 2013

(86) PCT No.: PCT/US2013/074058
§ 371 (c)(1),
(2) Date: Jun. 9, 2016

(87) PCT Pub. No.: WO2015/088492
PCT Pub. Date: Jun. 18, 2015

(65) Prior Publication Data
US 2016/0313794 A1    Oct. 27, 2016

(51) Int. Cl.
*G06F 3/0362* (2013.01)
*G06F 3/01* (2006.01)
*G06F 1/16* (2006.01)

(52) U.S. Cl.
CPC .............. *G06F 3/016* (2013.01); *G06F 1/163* (2013.01); *G06F 3/0362* (2013.01)

(58) Field of Classification Search
CPC ............................... G06F 3/0362; G06F 3/016
See application file for complete search history.

(56) References Cited

U.S. PATENT DOCUMENTS

| 3,824,587 A | 7/1974 | Fowler |
| 4,064,688 A | 12/1977 | Sasaki et al. |
| (Continued) | | |

FOREIGN PATENT DOCUMENTS

| CN | 203465677 | 3/2014 |
| WO | WO 09/023395 | 2/2009 |
| (Continued) | | |

OTHER PUBLICATIONS

U.S. Appl. No. 14/640,376, filed Mar. 6, 2015, Gowreesunker et al.
(Continued)

*Primary Examiner* — Vijay Shankar
*Assistant Examiner* — Cory A Almeida
(74) *Attorney, Agent, or Firm* — Brownstein Hyatt Farber Schreck, LLP (57) ABSTRACT

Apparatuses and methods for an electronic device to control the application of friction to a rotary input control with a shaft. In one example, the apparatus may include a spring bar member having a first surface and a second surface, the first surface positioned adjacent to the shaft; and a movable tension member positioned to engage the second surface of the spring bar; wherein as the tension member engages the spring bar, the spring bar engages the shaft and applies a frictional force to the shaft. In this manner, the apparatus can controllably apply a friction force of a desired amount to the rotary input control.

18 Claims, 7 Drawing Sheets

(56) References Cited

U.S. PATENT DOCUMENTS

| | | | |
|---|---|---|---|
| 4,199,741 A | 4/1980 | Serrus Paulet | |
| 4,275,674 A | 6/1981 | Carbonato | |
| 4,336,446 A | 6/1982 | Hafner | |
| 4,618,995 A | 10/1986 | Kemp | |
| 4,639,595 A | 1/1987 | Okita | |
| 4,641,182 A | 1/1987 | Gur | |
| 4,668,911 A | 5/1987 | Mueller | |
| 5,047,629 A | 9/1991 | Geist | |
| 5,254,919 A | 10/1993 | Bridges | |
| 5,382,792 A | 1/1995 | Hurst et al. | |
| 5,748,111 A | 5/1998 | Bates | |
| 5,867,082 A | 2/1999 | Van Zeeland | |
| 6,128,006 A * | 10/2000 | Rosenberg | G01C 21/36 345/161 |
| 6,252,825 B1 | 6/2001 | Perotto | |
| 6,639,206 B1 | 10/2003 | Rothamel et al. | |
| 6,862,832 B2 | 3/2005 | Barrett | |
| 7,034,237 B2 | 4/2006 | Ferri et al. | |
| 7,135,673 B2 | 11/2006 | Saint Clair | |
| 7,190,638 B2 | 3/2007 | Oguchi | |
| 7,230,959 B2 | 6/2007 | Johnson | |
| 7,265,336 B2 | 9/2007 | Hataguchi | |
| 7,385,874 B2 | 6/2008 | Vuilleumier | |
| 7,404,667 B2 | 7/2008 | Born et al. | |
| 7,520,664 B2 | 4/2009 | Wai | |
| 7,969,337 B2 | 6/2011 | Ratnakar et al. | |
| 8,002,089 B2 | 8/2011 | Jasso et al. | |
| 8,194,928 B2 | 2/2012 | Villaret | |
| 8,220,987 B2 | 7/2012 | Kimura et al. | |
| 8,305,171 B2 | 11/2012 | Kimura et al. | |
| 8,350,562 B2 | 1/2013 | Gailledrat | |
| 8,395,111 B2 | 3/2013 | Le | |
| 8,577,289 B2 | 11/2013 | Schlub et al. | |
| 8,649,004 B2 | 2/2014 | Schulz et al. | |
| 8,743,083 B2 | 6/2014 | Zanone et al. | |
| 8,759,747 B2 | 6/2014 | Ishizuka | |
| 8,783,944 B2 | 7/2014 | Doi | |
| 8,810,517 B2 | 8/2014 | Goto et al. | |
| 8,824,245 B2 | 9/2014 | Lau et al. | |
| 8,847,145 B2 | 9/2014 | Masa | |
| 9,088,282 B2 | 7/2015 | Holenarsipur et al. | |
| 9,091,715 B2 | 7/2015 | Alameh et al. | |
| 9,188,462 B2 | 11/2015 | Omoto et al. | |
| 9,223,296 B2 | 12/2015 | Yang | |
| 9,483,031 B2 | 11/2016 | Yanagisawa | |
| 9,490,804 B2 | 11/2016 | Hanumanthaiah et al. | |
| 9,651,405 B1 | 5/2017 | Gowreesunker et al. | |
| 2002/0054011 A1* | 5/2002 | Bruneau | A63F 13/06 345/156 |
| 2002/0054060 A1* | 5/2002 | Schena | G01D 7/007 715/701 |
| 2003/0201979 A1* | 10/2003 | Sandage | G06F 3/016 345/164 |
| 2007/0242569 A1 | 10/2007 | Inoue et al. | |
| 2008/0290261 A1 | 11/2008 | Doe | |
| 2010/0282955 A1 | 11/2010 | Poon | |
| 2012/0242626 A1* | 9/2012 | Hu | G06F 3/04897 345/184 |
| 2013/0076375 A1 | 3/2013 | Hanumanthaiah et al. | |
| 2014/0049496 A1 | 2/2014 | Szalkowski | |
| 2015/0048242 A1 | 2/2015 | Remillard et al. | |
| 2016/0058375 A1 | 3/2016 | Rothkopf | |
| 2016/0061636 A1 | 3/2016 | Gowreesunker et al. | |
| 2016/0069712 A1 | 3/2016 | Holenarsipur et al. | |
| 2016/0069713 A1 | 3/2016 | Holenarsipur et al. | |
| 2016/0109861 A1 | 4/2016 | Kim et al. | |
| 2016/0258784 A1 | 9/2016 | Boonsom et al. | |
| 2016/0313808 A1 | 10/2016 | Wu et al. | |
| 2017/0248446 A1 | 8/2017 | Gowreesunker et al. | |

FOREIGN PATENT DOCUMENTS

| | | |
|---|---|---|
| WO | WO 15/021391 | 2/2015 |
| WO | WO 15/034960 | 3/2015 |
| WO | WO 15/122885 | 8/2015 |

OTHER PUBLICATIONS

U.S. Appl. No. 14/796,895, filed Jul. 10, 2015, Holenarsipur et al.
U.S. Appl. No. 14/841,801, filed Sep. 1, 2015, Holenarsipur et al.
U.S. Appl. No. 14/936,421, Nov. 9, 2015, Ely et al.
International Search Report and Written Opinion dated Jun. 18, 2014, PCT/US2013/074058, 10 pages.
U.S. Appl. No. 15/714,691, filed Sep. 25, 2017, Lin et al.

* cited by examiner

INPUT FRICTION MECHANISM FOR ROTARY INPUTS OF ELECTRONIC DEVICES

CROSS REFERENCE TO RELATED APPLICATION

This application is a 35 U.S.C. § 371 application of PCT/US2013/074058, filed on Dec. 10, 2013, and entitled "Input Friction Mechanism for Rotary Inputs of Electronic Devices," which is incorporated by reference as if fully disclosed herein.

TECHNICAL FIELD

The present disclosure relates generally to inputs of electronic devices, and more particularly relates to rotary inputs used with electronic devices.

BACKGROUND

Electronic devices—such as mobile devices, mobile phones, tablet computers, music and multi-media players, wearable device, gaming devices, and other handheld, wearable or portable devices—have one or inputs such as buttons, touch screens, switches, and rotary inputs that can perform various functions.

With some rotary inputs or rotary controls, the present inventors have recognized that there may not be a mechanical stop or limit to a user rotating a rotary input, which can be problematic to the user experience.

Accordingly, as recognized by the present inventors, what is needed are mechanisms for providing tactile feel or feedback to the user when using a rotary input.

SUMMARY

According to one broad aspect of one embodiment of the present disclosure, disclosed herein is an apparatus for an electronic device that provides haptic feedback by controlling an application of friction to a rotary input control with a shaft. In one example, the apparatus may include a spring bar member positioned adjacent to the shaft; and a movable tension member positioned to engage the spring bar; wherein as the tension member engages the spring bar, the spring bar engages the shaft and applies haptic feedback in the form of a frictional force to the shaft. In this manner, the apparatus can controllably apply haptic feedback in the form of a friction force of a desired amount to the rotary input control.

In one example, the movable tension member is positioned about a midpoint along a length of the spring bar member, and the spring bar member has a first end and a second end, wherein both first and second ends are fixed. The spring bar member may be elongated with a generally flat profile, and may be made of various materials such as metal.

In one example, the apparatus may include a motor coupled with the movable tension member, wherein the motor controllably moves the movable tension member towards or away from the spring bar member. The motor may be a stepper motor.

According to another broad aspect of another embodiment of the present invention, disclosed herein is an electronic device for providing haptic feedback to a user which may include a processor; a rotary control input having a shaft, the rotary control input in communications with the processor; and a controllable friction mechanism selectively coupled with the shaft to selectively apply friction to the shaft thereby providing haptic feedback to the user, the controllable friction mechanism responsive to the processor.

In one example, the controllable friction mechanism includes a spring bar member having a first surface and a second surface, the first surface positioned adjacent to the shaft; and a movable tension member positioned to engage the second surface of the spring bar; wherein as the tension member engages the spring bar, the spring bar engages the shaft and applies a frictional force to the shaft. The electronic device may be an electronic wearable device, a portable device, a mobile phone, or other electronic device.

According to another broad aspect of another embodiment of the present invention, disclosed herein is a method for creating haptic feedback for a user of an electronic device having a rotary control input, the rotary control input having a shaft. In one example, the method may include detecting an event in the electronic device; and responsive to the detecting operation, and responsive to the detecting operation, applying a friction force to the shaft of the rotary control input to create haptic feedback for the user.

In one example, the applying operation applies the friction force at a specified level from a range of possible friction force levels. The applying operation may also include moving a bar member such that a portion of the bar member contacts the shaft, and the moving operation includes activating a motor to move a tension member to move the bar member.

Other embodiments of the disclosure are described herein. The features, utilities and advantages of various embodiments of this disclosure will be apparent from the following more particular description of embodiments as illustrated in the accompanying drawings.

DETAILED DESCRIPTION

Various examples of controllable friction mechanisms are described herein that provide haptic feedback to the user when using a rotary control input of an electronic device. In one example, the controllable friction mechanisms are coupled with rotary control inputs of electronic devices in order to provide an adjustable, controllable and variable amount of haptic feedback such as friction, drag or braking across a wide range of values as experienced by the user when rotating a rotary control input. In this manner, a rotary control input of an electronic device can be provided with a controllable amount of haptic feedback or resistance to rotation of the rotary control input, in one or both directions of rotation, and the friction can be selectively activated based on the occurrence of one or more events as detected by the electronic device.

Figure 1A:
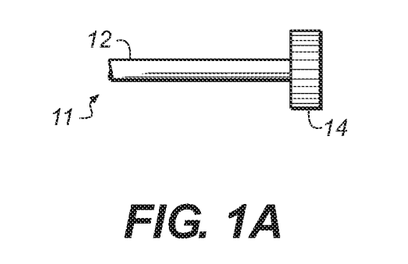
FIGS. 1A-1B illustrate examples of a typical rotary control input.
Figure 1B:
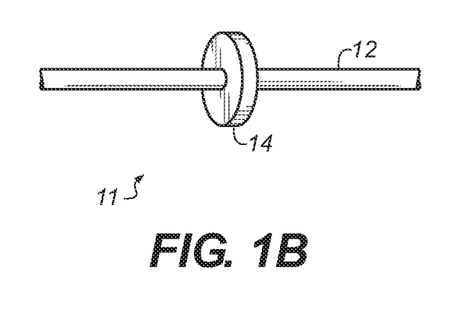

Referring to FIGS. 1A-1B, electronic devices 10 may include a rotary input or rotary control 11 having a shaft or stem 12 with one or more dials, wheels or crowns 14 coupled with shaft 12. In one example, shaft 12 may be cylindrical, or may have other cross-sectional shapes such as oval, square, rectangular, or other shapes depending upon the particular implementation. The dial or crown 14 may be connected with an end of shaft 12 (FIG. 1A), or may be positioned along various locations of shaft 12 depending upon the implementation (FIG. 1B). The crown 14 and shaft 12 may be made of various materials such as metals, plastics, rubber, or other rigid materials. For purposes of this disclosure, the terms rotary control input, rotary control and rotary input are used interchangeably; and the terms dials, wheel and crowns are also used interchangeably.

Figure 2:
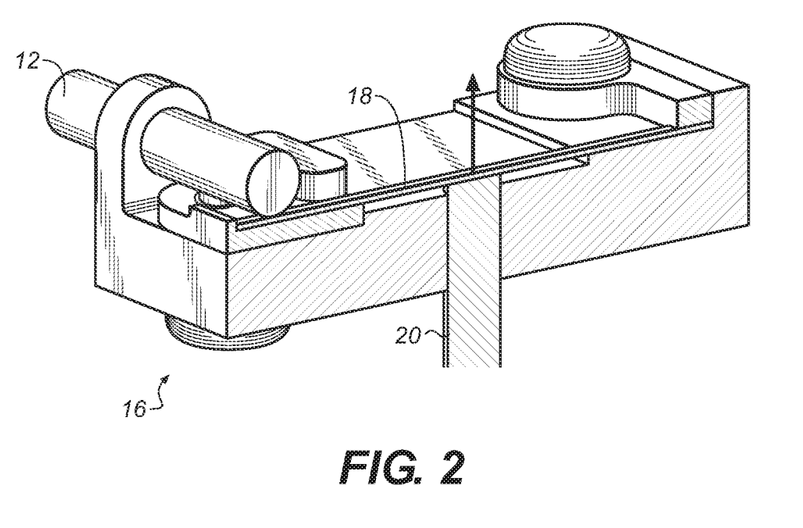
FIG. 2 illustrates an example of a controllable friction mechanism for a rotary control input, in accordance with one embodiment of the present disclosure.
Figure 3:
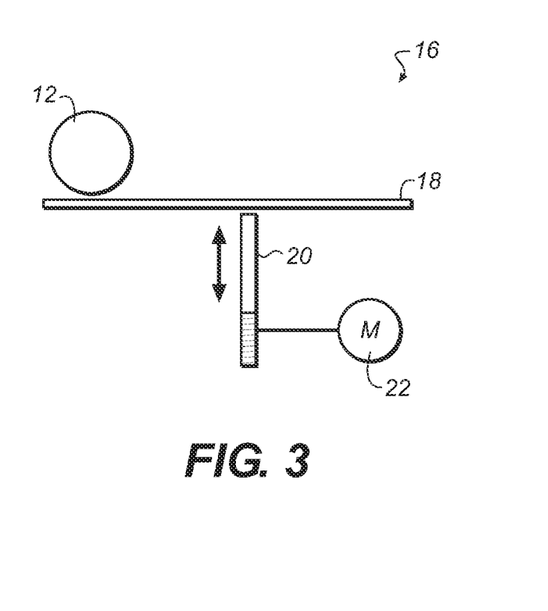
FIG. 3 illustrates an example of a controllable friction mechanism for a rotary control input, in accordance with one embodiment of the present disclosure.

Referring to FIGS. 2-3, an example of a controllable friction mechanism 16 is illustrated with a shaft 12 (shown in cross-section in FIG. 3) of a rotary control input 11 of an electronic device 10. In this example, a bar member or spring bar 18 (these terms are used interchangeably) is positioned adjacent to or proximate to the outer portion of the shaft 12 of the rotary control input 11. A movable tension member or pin 20 may be coupled with a motor 22 (such as a stepper motor) which can be controlled by the electronic device 10. The movable tension member 20, in one example, is positioned near or about a midpoint along the length of spring bar 18, and may be positioned on an opposing side of spring bar 18 in relation to the position of shaft 12. In one example, the movable tension member 20 may implemented using a screw rotating in a threaded busing under the control of the motor 22.

The spring bar 18 may take various shapes, and in FIGS. 2-3 the spring bar 18 may have a generally flat profile and may be elongated with a generally rectangular shape in one example. The spring bar 18 may have a top surface and a bottom surface, and in example the top surface engages the shaft 12 of the rotary control input 11, and the bottom surface is engaged by the movable tension member 20. The spring bar 18 may be made of metal, plastic, rubber, or other conventional material. In one example, the spring bar 18 may have an elastic property, such that the spring bar 18 can be deflected temporarily in response to a force, and returns to its initial state or position when the force is removed.

The spring bar 18 may be fixed or pivoted at or near its two ends, and free to be moved or deflected along its length about its midpoint in one example. For instance, the ends of spring bar 18 may be fixed within a housing or within a subassembly of the electronic device.

As illustrated in FIGS. 4A-4D, the movable tension member 20 can be selectively and controllably moved upwardly so as to temporarily move, deform, bend or deflect the spring bar 18 in an upward direction. As spring bar 18 moves upwardly, a portion of spring bar 18 comes in contact with shaft 12 of rotary control input 11 and applies a greater amount of frictional force or braking force against the shaft 12. The variable movement of the tension member 20 against the spring bar 18 creates a variable amount of friction force against the shaft 12. The frictional or braking force against the shaft 12 of rotary control input 11 can be felt by the user as a haptic effect when the rotates or attempts to rotate crown 14.

Figure 4A:
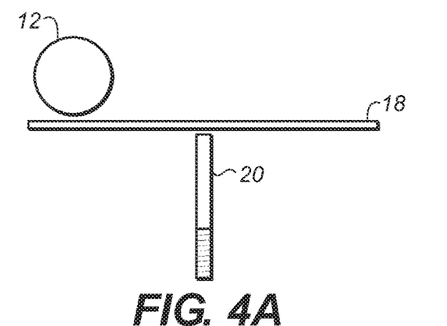
FIGS. 4A-4D illustrate an examples of a controllable friction mechanism for a rotary control input, applying differing levels or amounts of friction to the rotary control input, in accordance with one embodiment of the present disclosure.

For instance, in FIG. 4A, the spring bar 18 and the movable tension member 20 are in an initial or default position, wherein an initial amount of friction is applied by the spring bar 18 to the shaft 12 of the rotary control input 11. In one example, the initial amount of friction applied to the shaft by the spring bar 18 may be slight or no friction, depending upon the particular implementation. In another example, the initial amount of friction applied to the shaft 12 by spring bar 18 in response to movable tension member 20 is selected to prevent the rotary control input 11 (including crown 14) from rotating by itself without any active user input. In other words, the initial amount of friction applied by the controllable friction mechanism 16 to the rotary control input 11 requires that the user overcome the initial amount of friction by actively rotating the crown 14 of the rotary control input 11. In this manner, the controllable friction mechanism 16 can help reduce undesired or accidental rotations of the rotary control input 11.

Figure 4B:
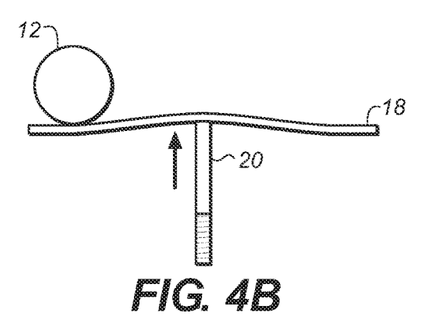
Figure 4C:
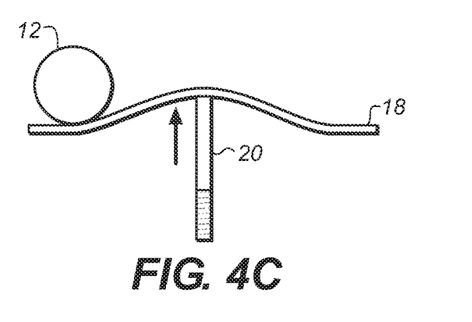

In FIG. 4B, under the control of electronic device 10, the movable tension member 20 is moved upwardly to exert a force on spring bar 18, and spring bar 18 contacts shaft 12 and thereby applies an amount of frictional force to shaft 12 in an amount greater than the initial amount of frictional force associated with FIG. 4A, but less than the amount of frictional force associated with FIG. 4C.

Figure 4D:
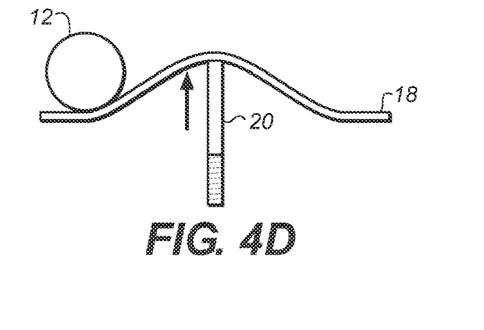

In FIG. 4C, under the control of electronic device 10, the movable tension member 20 is moved upwardly to exert a greater force on spring bar 18, and spring bar 18 contacts shaft 12 and thereby applies an amount of frictional force to shaft 12 in an amount greater than the amount of frictional force associated with FIG. 4B but less than the amount of frictional force associated with FIG. 4D.

In FIG. 4D, under the control of electronic device 10, the movable tension member 20 is moved upwardly to exert a greater force on spring bar 18, and spring bar 18 contacts shaft 12 and thereby applies an amount of frictional force to shaft 12 in an amount greater than the amount of frictional force associated with FIG. 4C.

In one example, a maximum position or limit of movable tension member 20 may be established, for instance through control of stepper motor 22 or through a surface or structure that can be positioned to limit the upward movement of spring bar 18.

Figure 5:
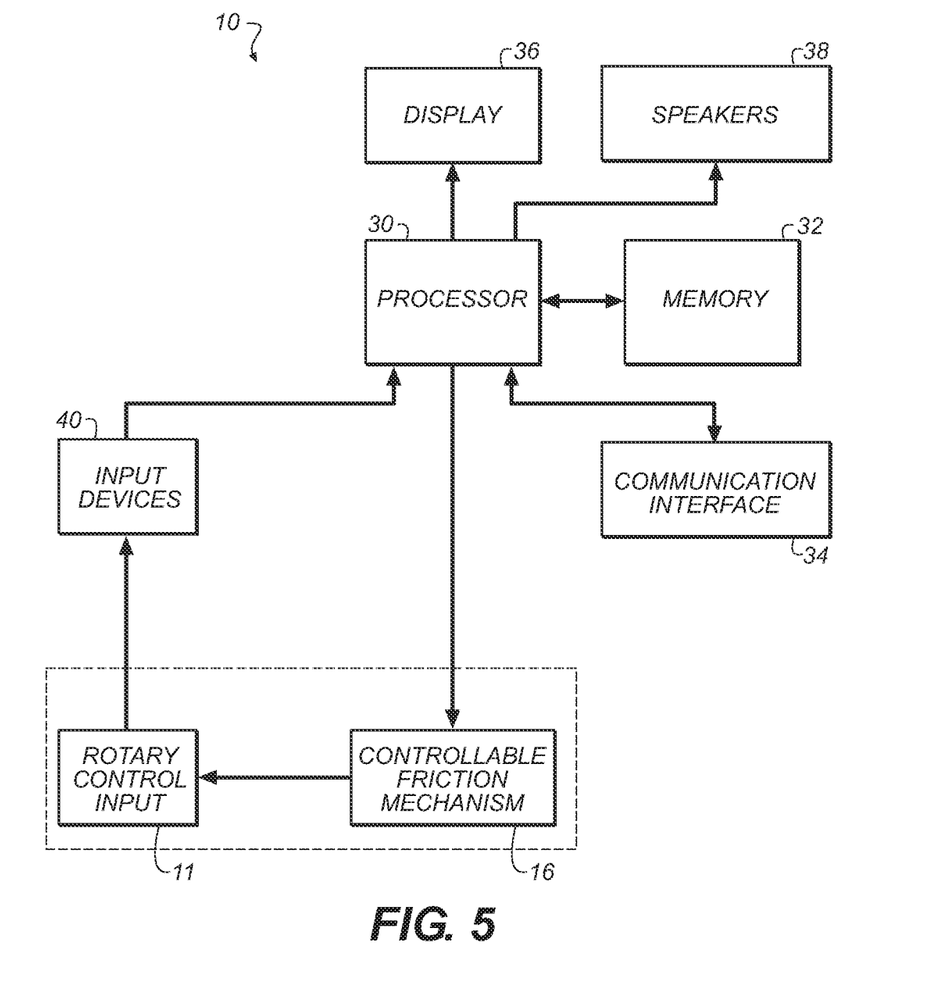
FIG. 5 illustrates an example of an electronic device having a controllable friction mechanism for a rotary control input, in accordance with one embodiment of the present disclosure.

Controllable friction mechanism 16 can be used to provide haptic feedback to a user of a variety of rotary control inputs in a variety of electronic devices 10. FIG. 5 illustrates an example of a block diagram of an electronic device 10 having a rotary control input 11 with a controllable friction mechanism 16 coupled thereto.

The electronic device 10 may also include a processor 30 coupled with or in communications with memory 32, communication interfaces 34 coupled with or in communications with processor 30, output devices such as displays 36 and speakers 38, and a plurality of input devices 40. Communication interfaces 34 can provide electronic communications between device 10 and any external communication network, device or platform, such as but not limited to wireless interfaces, Bluetooth interfaces, USB interfaces, Wi-Fi interfaces, TCP/IP interfaces, network communications interfaces, or any conventional communication interfaces.

The electronic device 10 may also include a processor 30 coupled with or in communications with memory 32, communication interfaces 34 coupled with or in communications with processor 30, output devices such as displays 36 and speakers 38, and a plurality of input devices 40. Communication interfaces 34 can provide electronic communications between device 10 and any external communication network, device or platform, such as but not limited to wireless interfaces, Bluetooth interfaces, USB interfaces, Wi-Fi interfaces, TCP/IP interfaces, network communications interfaces, or any conventional communication interfaces. The wearable device 10 may provide information regarding time, health, statuses or externally connected or communicating devices and/or software executing on such devices, messages, video, operating commands, and so forth (and may receive any of the foregoing from an external device), in addition to communications.

In one example, electronic device 10 may be configured in the form of a wearable health assistant that provides health-related information (whether real-time or not) to the user, authorized third parties, and/or an associated monitoring device. Device 10 may be configured to provide health-related information or data such as but not limited to heart rate data, blood pressure data, temperature data, oxygen level data, caloric data, diet/nutrition information, medical reminders, health-related tips or information, or other health-related data. The associated monitoring device may be, for example, a tablet computing device, phone, personal digital assistant, computer, and so on.

The rotary control input 11 may include dials, wheels, crowns or other rotary inputs. The rotary control inputs 11 is in communications with and provides data to the processor 30 regarding movement or rotation of the rotary control input, and such data may include but is not limited to increments of rotations, rotation amounts, rotation directions (up/down, clockwise/counterclockwise, forward/reverse), and rotation rates.

In one example, controllable friction mechanism 16 is responsive to and/or controlled by processor 30. For instance, if the electronic device 10 is displaying content in a list form and the user is scrolling through the list by rotating the crown 14 of the rotary control input 11, the processor may detect that the end of the list is being approached, and therefore the processor may signal to the controllable friction mechanism 16 to increase the amount of friction on the rotary control input 11 so as to signal to the user that the end of the displayed list is approaching. Other examples of when to apply friction or reduce friction as applied by the controllable friction mechanism 16 to the rotary control input 11 of an electronic device 10.

Figure 7:
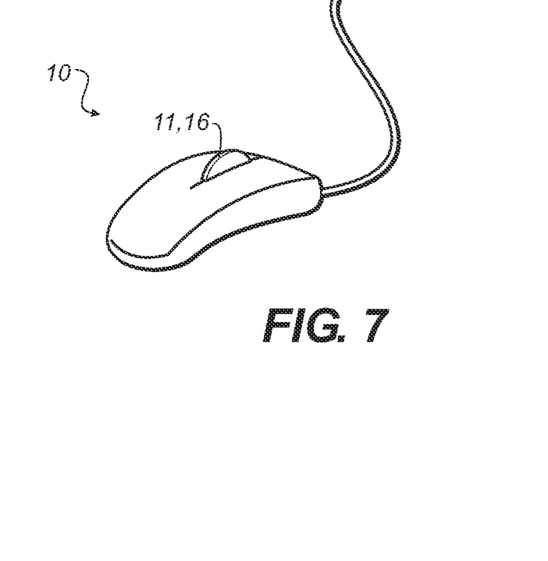
FIG. 7 illustrates an example of an electronic device in the form of a mouse having a controllable friction mechanism for a rotary control input, in accordance with one embodiment of the present disclosure.
Figure 8:
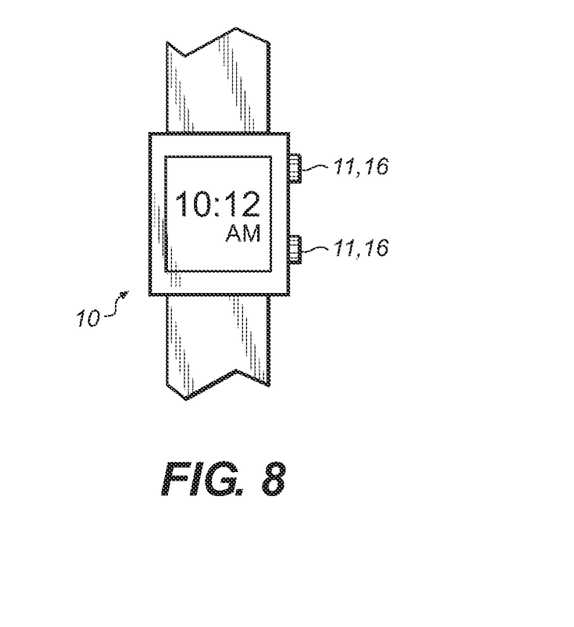
FIG. 8 illustrates another example of an electronic device in the form of a wearable device having a controllable friction mechanism for a rotary control input, in accordance with one embodiment of the present disclosure.

Examples of electronic devices 10 utilizing rotary control inputs 11 with controllable friction mechanisms 16 may include but are not limited to devices such as mouse input devices (FIG. 7), electronic, computer or wearable communication devices (FIG. 8), provided as illustrative examples only. Electronic devices 10 utilizing embodiments of the present disclosure may also include mobile devices, mobile phones, tablet computers, music and multi-media players, gaming devices, wearable health assistant devices, and other handheld, wearable or portable devices.

Figure 6:
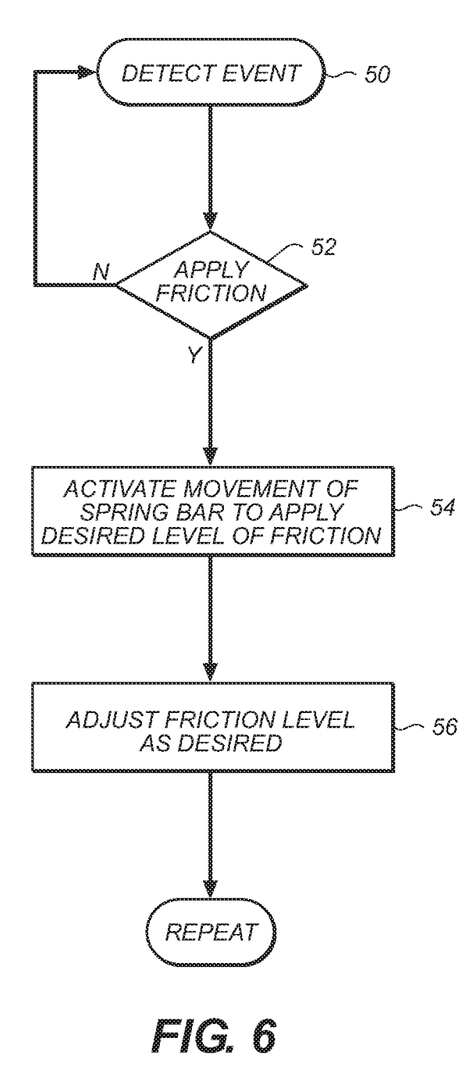
FIG. 6 illustrates an example of a process for applying friction to a rotary control input of an electronic device, in accordance with one embodiment of the present disclosure.

FIG. 6 illustrates an example of a process for applying friction to a rotary control input of an electronic device, in accordance with one embodiment of the present disclosure. This process, including portions thereof, can be implemented by an electronic device.

At operation 50, an event is detected by the electronic device which can be used to trigger the application of friction to a rotary control input. For instance, if a user is rotating a rotary control input in order to scroll a display or content therein, such an event may require the controlled application of friction to the rotary control input when the user begins to reach the end of a document, list, video, song, or display window; in this manner, the controlled application of friction to the rotary control input provides the user with haptic feedback that the user should reduce or slow down the rotation of the rotary control input, and such feedback can also indicate to the user that the user is nearing or has reached the end of the document, content or window.

Another example of an event which may require application of friction to a rotary control input could involve a user cycling up and down through a menu of different options, if it is desired to indicate the top of a list or the bottom of the list through the use of increased friction applied to a rotary control input.

Another example of an event which may require application of friction to a rotary control input could involve deterring the user from rotating the rotary control input in a first direction and thereby encouraging the user to rotate the rotary control input in the other direction. This can be achieved for instance in one example, by applying a high or maximum level of friction or braking to the rotary control input, and then removing the friction applied by the controllable friction mechanism at a later time if the user does not continue to rotate the rotary control input in the first direction.

Operation 52 determines whether it is necessary to apply friction to a rotary control input. If so, control is passed to operation 54, otherwise control may be returned to operation 50 to wait for a triggering event to occur.

At operation 54, assuming an event has occurred that triggers or requests application of friction to the rotary control input, movement of the spring bar is activated to apply a desired level or amount of frictional force to the shaft of the rotary control input.

At operation 56, the level of friction applied to the rotary control input may be adjusted upwardly or downwardly as desired. Operation 56 may be performed in response to control signals or instructions received from processor 30 of electronic device 10. For instance, a signal may be communicated to controllable friction mechanism 16 which indicates "apply maximum friction", "apply minimum friction", "apply a specified friction level" as desired, "increase friction" level, "decrease friction" level or other signal.

A combination or sequence of differing friction amounts could be applied to the rotary control input shaft to simulate various effects. For instance, in one example, a level of friction could be cycled on then off, on then off, on then off, etc., so as to create or simulate a "ratcheting" effect modeled after mechanical winder controls.

Hence, the operations of FIG. 6 provide an adjustable and selectable amount of friction as experienced by the user when a rotating rotary control input. In this manner, a rotary control input of an electronic device can be provided with a controllable amount of feedback or resistance to rotation of the rotary control input in one or both directions of rotation.

Accordingly, it can be seen that embodiments of the present invention provide for the controllable application of a desired level of friction forces against a rotary control input, thereby providing the user with haptic feedback when the user utilizes the rotary control input during use of an electronic device.

While the methods disclosed herein have been described and shown with reference to particular operations performed in a particular order, it will be understood that these operations may be combined, sub-divided, or re-ordered to form equivalent methods without departing from the teachings of the present disclosure. Accordingly, unless specifically indicated herein, the order and grouping of the operations is not a limitation of the present disclosure.

It is understood that the directional references provided herein, such as top, bottom, upwards, downwards, clockwise, counterclockwise, left, right, and the like, are provided to describe examples of the embodiments disclosed herein, and are not intended to be limiting.

It should be appreciated that in the foregoing description of exemplary embodiments of the disclosure, various features of the disclosure are sometimes grouped together in a single embodiment, Figure, or description thereof for the purpose of streamlining the disclosure and aiding in the understanding of one or more of the various aspects. This method of disclosure, however, is not to be interpreted as reflecting an intention that the claims require more features than are expressly recited in each claim. Rather, inventive aspects lie in less than all features of a single foregoing disclosed embodiment, and each embodiment described herein may contain more than one inventive feature.

While the disclosure is presented and described with reference to embodiments thereof, it will be understood by those skilled in the art that various other changes in the form and details may be made without departing from the spirit and scope of the disclosure.

We claim:

1. An apparatus for providing haptic feedback in an electronic wearable device having a rotary input control with a shaft, comprising:
   a spring bar positioned adjacent to the shaft;
   a movable tension member positioned to engage the spring bar; and
   a motor coupled with the movable tension member, wherein the motor controllably moves the movable tension member toward or away from the spring bar, causing the movable tension member to engage or disengage the spring bar;
   wherein at least one portion of the spring bar is fixed to the electronic wearable device apart from the movable tension member and apart from the shaft, and as the tension member engages the spring bar, the spring bar deflects and engages the shaft and applies a frictional force to the shaft.

2. The apparatus of claim 1, wherein the movable tension member is positioned to engage the spring bar about a midpoint along a length of the spring bar.

3. The apparatus of claim 1, wherein the spring bar is fixed to the electronic wearable device, apart from the movable tension member, at a first end of the spring bar and a second end of the spring bar.

4. The apparatus of claim 1, wherein the spring bar is elongated with a generally flat profile and a rectangular shape, the rectangular shape having an elongate dimension oriented perpendicular to the shaft.

5. The apparatus of claim 1, wherein the spring bar is made of metal.

6. The apparatus of claim 1, wherein the motor is a stepper motor.

7. An electronic wearable device for providing haptic feedback to a user, comprising:
   a processor;
   a rotary control input having a crown coupled to a shaft, the rotary control input in communication with the processor; and
   a controllable friction mechanism selectively coupled with the shaft to selectively apply friction to the shaft, thereby creating haptic feedback to the user via the crown, the controllable friction mechanism responsive to the processor to selectively apply friction to the shaft, and the controllable friction mechanism comprising a spring bar fixed to a housing of the electronic wearable device or a subassembly of the housing of the electronic wearable device, the spring bar deflecting when the controllable friction mechanism increases the friction applied to the shaft.

8. The electronic wearable device of claim 7, wherein:
   the spring bar comprises a first surface and a second surface, the first surface positioned adjacent to the shaft;
   the controllable friction mechanism further comprises a movable tension member positioned to engage the second surface of the spring bar; and
   as the tension member engages the spring bar, the spring bar deflects and engages the shaft and applies a frictional force to the shaft.

9. The electronic wearable device of claim 8, wherein the movable tension member is positioned to engage the spring bar about a midpoint along a length of the spring bar.

10. The electronic wearable device of claim 8, wherein the spring bar is fixed to the electronic wearable device at a first end of the spring bar and a second end of the spring bar.

11. The electronic wearable device of claim 8, wherein the spring bar is elongated with a generally flat profile and a rectangular shape, the rectangular shape having an elongate dimension oriented perpendicular to the shaft.

12. The electronic wearable device of claim 8, further comprising: a motor coupled with the movable tension member, wherein the motor controllably moves the movable tension member towards or away from the spring bar.

13. The electronic wearable device of claim 7, wherein the electronic wearable device is a wearable communications device.

14. A method for creating haptic feedback for a user of an electronic wearable device having a crown connected to a shaft, the method comprising:
   detecting an event in the electronic wearable device; and
   responsive to detecting the event, applying a friction force to the shaft to create haptic feedback for the user as the user rotates the crown, wherein:
   the friction force is applied to the shaft in response to a processor generating at least one of a control signal or an instruction, the control signal or the instruction generated in response to the detection of the event; and
   the friction force is applied to the shaft by deflecting a spring bar fixed to a housing or a subassembly of the electronic wearable device.

15. The method of claim 14, wherein the applying operation applies the friction force at a specified level.

16. The method of claim 14, wherein the deflecting operation includes activating a motor to move a tension member to deflect the spring bar.

17. The method of claim 14, wherein the electronic wearable device is a wearable communications device.

18. The method of claim 14, wherein the electronic wearable device is a wearable health assistant.

\* \* \* \* \*